US010143902B1

(12) United States Patent
Cavill et al.

(10) Patent No.: US 10,143,902 B1
(45) Date of Patent: Dec. 4, 2018

(54) FLEXIBLE GRIP FOR A GOLF CLUB AND METHOD OF MAKING SAME

(71) Applicant: Eaton Intelligent Power Limited, Dublin (IE)

(72) Inventors: Gregory William Cavill, Pinehurst, NC (US); Bill D. Wood, Whispering Pines, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/813,394

(22) Filed: Nov. 15, 2017

(51) Int. Cl.

| | |
|---|---|
| ***A63B 53/14*** | (2015.01) |
| ***A63B 60/14*** | (2015.01) |
| ***B29C 43/52*** | (2006.01) |
| ***B29C 43/02*** | (2006.01) |
| *B29L 31/52* | (2006.01) |
| *A63B 102/32* | (2015.01) |

(52) U.S. Cl.
CPC .............. *A63B 53/14* (2013.01); *A63B 60/14* (2015.10); *B29C 43/021* (2013.01); *B29C 43/027* (2013.01); *B29C 43/52* (2013.01); *A63B 2102/32* (2015.10); *A63B 2209/00* (2013.01); *B29L 2031/5227* (2013.01)

(58) Field of Classification Search
CPC . A63B 2209/00; A63B 2102/32; A63B 53/14; A63B 60/14; B29C 43/52; B29C 43/027; B29C 43/021; B29L 2031/5227
See application file for complete search history.

(56) References Cited

U.S. PATENT DOCUMENTS 2,437,404 A * 3/1948 Robinson ............... A63B 60/10 473/203
3,706,453 A * 12/1972 Rosasco, Jr. ........... A63B 60/10 473/203
6,511,386 B1 * 1/2003 Cacicedo ............... A63B 49/08 473/300
7,458,902 B2 * 12/2008 Gill ........................ A01K 87/08 473/299
7,758,447 B2 * 7/2010 Sugimae ................ A63B 53/14 473/303
8,419,566 B2 * 4/2013 Gill ........................ A63B 53/14 473/299
2003/0228929 A1 * 12/2003 Miyasu .................. A63B 60/00 473/300
2006/0068148 A1 * 3/2006 Ulrich .................... A63B 53/14 428/41.8

(Continued)

FOREIGN PATENT DOCUMENTS

JP 2000176061 A * 6/2000

*Primary Examiner* — Stephen Blau
(74) *Attorney, Agent, or Firm* — Fay Sharpe LLP

(57) ABSTRACT

A flexible grip of elastomeric material for a golf club is disclosed. The grip has a groove or pocket therealong on the inner surface and an aperture through the closed end of the grip coincident with the groove. Upon installation of the grip onto the club shaft, a rigid strip is inserted through the aperture and into the groove or pocket. The thickness of the strip is chosen to cause a raising of the outer surface of the grip to form a rib therealong. The interior groove or pocket is formed by a rib formed on a core or mandrel employed in molding of the grip. Upon removal of the mandrel after molding, the groove or pocket and aperture are left in the grip for receiving the rigid strip.

10 Claims, 9 Drawing Sheets

(56) References Cited

U.S. PATENT DOCUMENTS

| | | | | |
|---|---|---|---|---|
| 2009/0321011 | A1* | 12/2009 | Ulrich .................... | A63B 53/14 |
| | | | | 156/291 |
| 2018/0078836 | A1* | 3/2018 | Davis ..................... | A63B 60/14 |

* cited by examiner

FLEXIBLE GRIP FOR A GOLF CLUB AND METHOD OF MAKING SAME

BACKGROUND

In recent times, it has been found desirable to provide a raised portion or rib along the direction of elongation of the flexible golf club grip to promote correct club alignment for the user of the club. Flexible golf club grips are typically made of molded elastomer, and, in the manufacture of such flexible grips for golf clubs, it has been found desirable, upon removal of the flexible grip from the curing mold, to buff the outer surface of the grip to remove any mold release compound and to provide a textured surface for enhancing the gripability. The buffing operation has been found to remove excessive amounts of the elastomeric material forming the raised portion or rib along the grip; and, has thus made it challenging to control the height of the raised portion or rib as it relates to USGA/R&A rules in the finished product.

Heretofore, the raised rib on a flexible golf club grip has been provided by forming a groove in the mold core or mandrel which, upon molding, provides a rib on the internal periphery of the flexible grip. Upon removal of the grip from the mold after curing, and subsequent assembly onto the shaft of the golf club, the internal rib causes the outer periphery of the flexible grip to be distorted and raised therealong to provide the external rib on the outer periphery. The external rib thus formed is accomplished by distorting the material of the flexible grip and has resulted in the inability to control the size and configuration of the rib which has been found to be undesirable from both an aesthetic and gripability standpoint. Thus, it has been desired to provide a way or means of forming a rib along the outer periphery of the flexible golf club grip in a manner which enables control of the height and configuration of the rib in the molded elastomeric grip.

Referring to FIGS. 7 and 8, the technique for providing an external rib on the flexible golf club grip employed in the prior art is illustrated wherein a mandrel 1 has a longitudinal groove 2 formed therein on the exterior thereof; and, uncured elastomeric material 3 is disposed on the mandrel with the material entering the groove 2 to form an internal rib on the flexible grip. The mandrel with uncured elastomer is then placed in a mold comprising an upper section 4 and a lower section 5 and the mold is closed and heated to effect curing of the elastomeric grip. Upon removal of the mandrel and grip from the mold after curing, the mandrel 1 is removed from the grip. Upon completion of any finishing operations, the grip is then assembled over the shaft of a golf club, denoted by reference numeral 6 in FIG. 8, and the cured grip 7 is subsequently received over the club shaft 6 such that the rib formed on the internal periphery of the grip causes the grip to be distorted and produces the rib 8.

BRIEF DESCRIPTION

The present disclosure describes a flexible elastomeric grip and method of making same for a golf club and is of the type having a longitudinal rib or raised portion provided on the outer periphery thereof for enhancing club alignment. In one version, the elastomeric grip of the present disclosure has a groove formed longitudinally therein on the inner periphery during molding. The groove is formed by providing a rib on a core or mandrel employed for molding of the tubular flexible grip. Upon removal of the grip from the mold after curing, the mandrel is removed and thus the groove is formed on the inner periphery.

The molded grip has an aperture provided in the closed end thereof providing access to an end of the internal groove or pocket formed therealong. Subsequently, upon assembly to a club shaft, a relatively thin strip of rigid material is inserted through the aperture and into the groove along the grip. The strip is configured to provide a sufficient interference fit in the groove in the radial direction so as to effect stretching or raising of the material therealong to form an rib on the outer periphery of the flexible grip. The size or height and shape of the external rib is therefore determined by the dimensions and shape of the rigid strip inserted in the groove.

In another version, a longitudinal pocket if formed in the grip that is a portion of the length of the grip. This pocket is formed via a secondary core attached to the main corebar at two or more points allowing the elastomer to encase the secondary core to form a sealed pocket. The end of the pocket coincides with the aperture formed in the closed end; and, upon assembly of the molded grip onto the club shaft, the rigid strip is inserted through the aperture and into the pocket to form a raised rib on the exterior of the grip.

DETAILED DESCRIPTION

Figure 1:
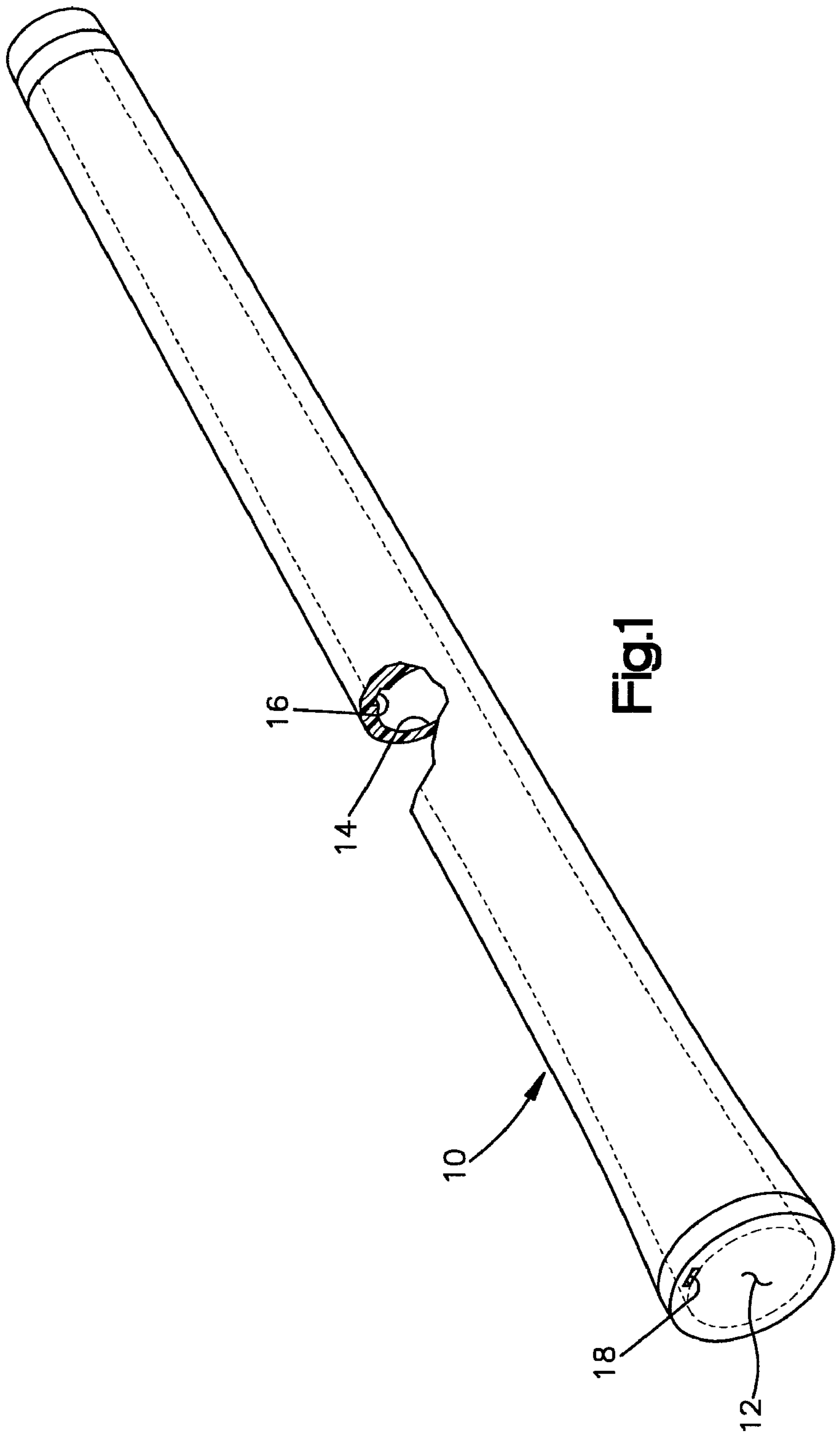
FIG. 1 is a perspective view of the finished grip of one version of the present disclosure; with a portion broken away to show the internal groove.

Referring to FIG. 1, a flexible golf grip formed of elastomeric material is indicated generally at 10 and has a substantially closed end 12 and a hollow tubular configuration with the inner wall 14 thereof formed with a longitudinally extending groove, which groove is denoted by reference numeral 16. The closed end 12 of the flexible grip 10 has an aperture 18 formed therein which is located and configured to align with the longitudinal groove 16. The aperture 18 thus provides communication with an end of the groove 16. The provision and function of the groove will hereinafter be described in greater detail.

Figures 2, 3:
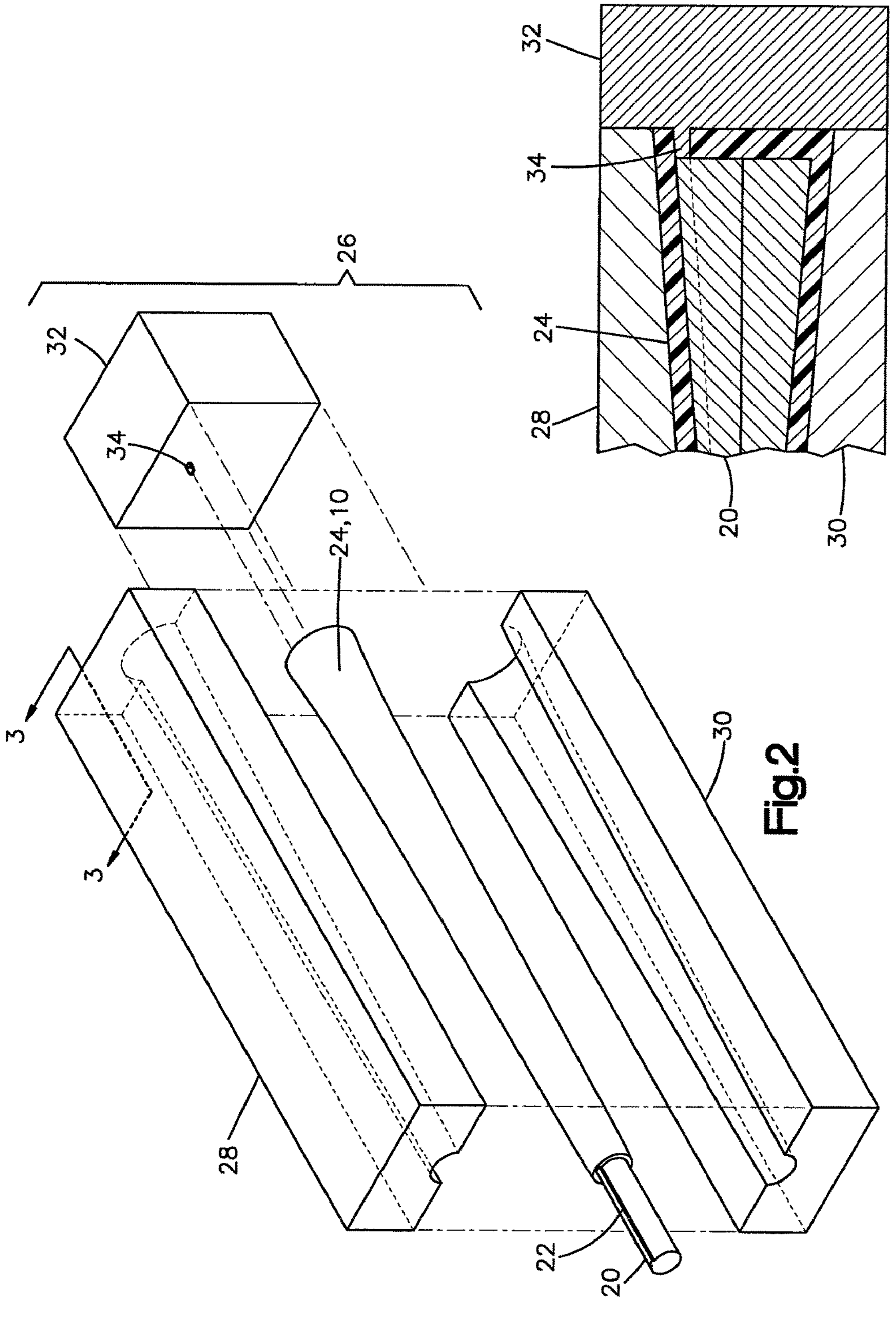
FIG. 2 is an exploded view of the arrangement for molding the grip of FIG. 1.
FIG. 3 is a portion of a section view taken along section indicating lines 3-3 and shows the arrangement of the material in the mold when closed in preparation for curing.

Referring to FIGS. 2 and 3, a core or mandrel 20 which has formed therealong a raised portion or rib 22 which extends therealong is provided for molding. The diameter of the mandrel 20 is chosen to enable the cured or vulcanized grip to be assembled over the shaft of a golf club with a slight interference fit to provide retention of the grip onto the club shaft. The rib 22, is dimensioned and shaped to provide a desired internally formed groove as denoted by reference numeral 16 in FIG. 1. The mandrel has disposed or wrapped thereon a suitable amount of uncured elastomeric material of a composition to provide the desired hardness or durometer for the finished grip 10. The elastomeric material is indicated by reference numeral 24 in FIG. 2.

With continuing reference to FIG. 2, a mold indicated generally at 26 is shown in opened or exploded configuration; and, the mold includes an upper section 28, a lower section 30, and an end mold section 32 which has a lug or pin 34 extending from a face thereof. The lug or pin 34 is located, configured and sized to coincide with the aperture 18 (see FIG. 1); and, the section 32 forms, in cooperation with the end of the mandrel 20, the closed end 12 of the flexible grip. Alternatively, the pin 34 could be provided on the end (not visible in FIG. 2) of the mandrel 22. The mold 26 of FIG. 2 is then closed and clamped to provide compression on the uncured elastomeric material 24 to form the desired configuration for the grip 10. The mold 26 and is then heated to effect vulcanization or curing of the elastomeric material.

Referring to FIG. 3, the end of the closed mold with the elastomeric material disposed therein is shown to provide the aperture 14 during the molding operation. Upon completion of the molding, the mold is opened and the cured elastomer upon the mandrel 20 is removed from the mold; and, the mandrel 20 is then removed from the cured grip 10 whereupon the rib 22, on the mandrel leaves the groove 16 formed on the interior of the cured grip and also the aperture 12 formed by pin 34.

Figure 4:
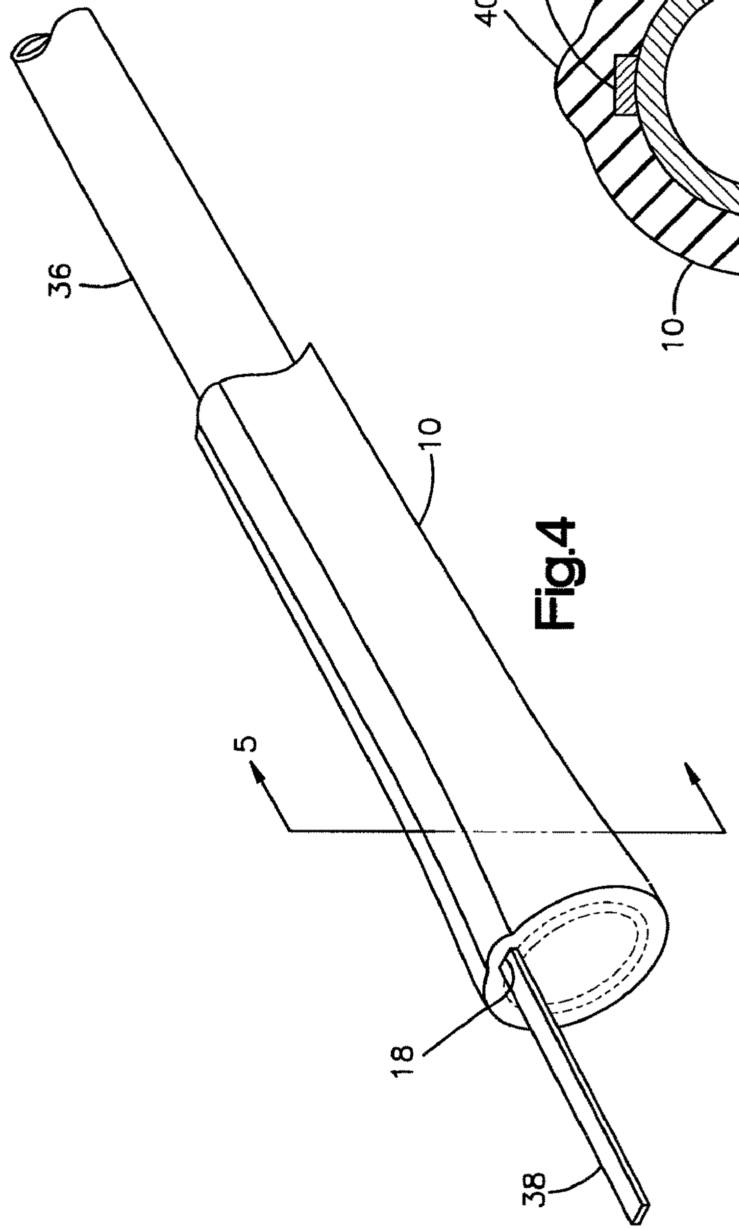
FIG. 4 is a perspective view of the grip of the present disclosure when assembled on the shaft of a golf club with the rigid strip being inserted therein.
Figure 5:
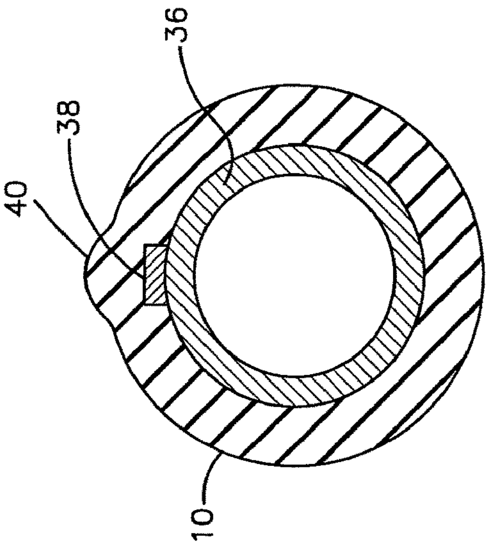
FIG. 5 is a section view taken along section indicating lines 5-5 of FIG. 4.

Referring to FIGS. 4 and 5, the cured grip 10 is shown assembled over the shaft 36 of a golf club; and, a relatively thin strip of rigid material 38 is received through the aperture 18 and into the groove 16 with a predetermined interference fit to effect stretching or raising of the material of the wall 14 of the grip in the radial direction in such a manner as to form therealong an rib 40.

In the present practice, it has been found satisfactory to form the grip 10 elastomeric material having a durometer hardness in the range of 25-75 on the Shore “A” scale. In the present practice, it has been found satisfactory to utilize a rigid strip 38 having a width in the range of 2 to 9 millimeters and a thickness in the range of 0.127 to 1.016 millimeters. It has also been found satisfactory to form the strip 38 of one of (i) Metal, (ii) Plastic, and (iii) composite material. The strip 38 may have a uniform cross-section therealong; or, the cross-section or thickness may be varied therealong to provide a changing shape to the rib.

Figure 6:
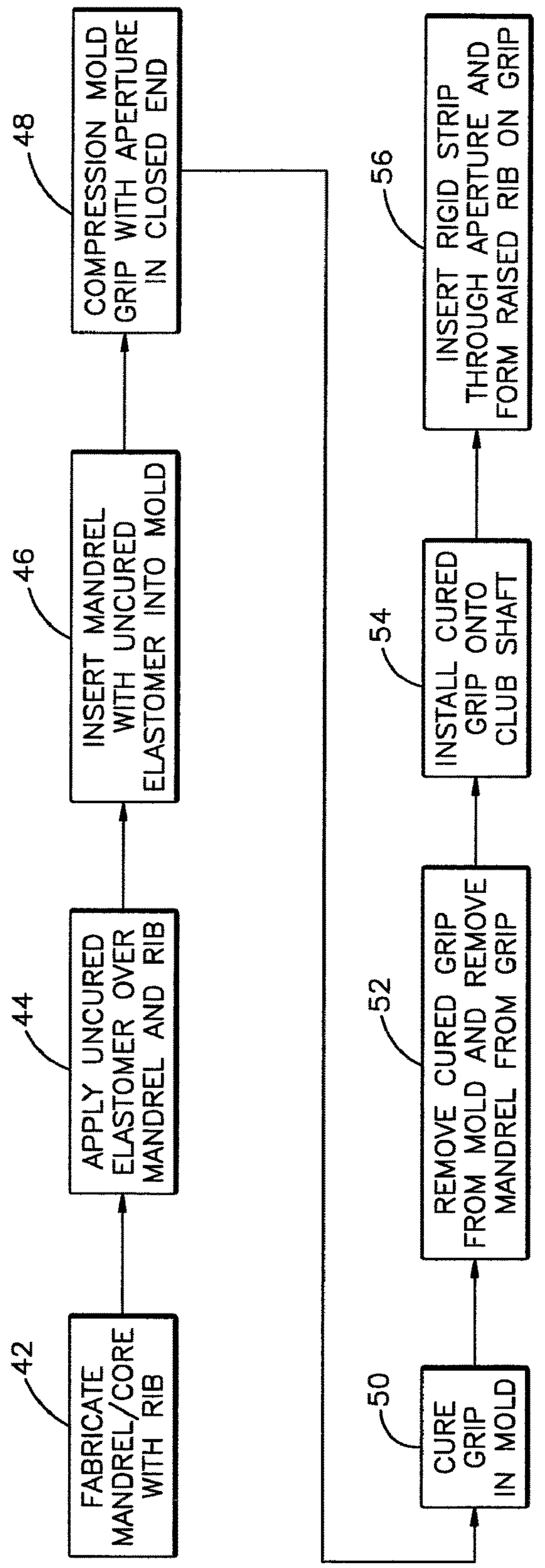
FIG. 6 is a block flow diagram of the process of compression molding the grip of the present disclosure.
Figure 8:
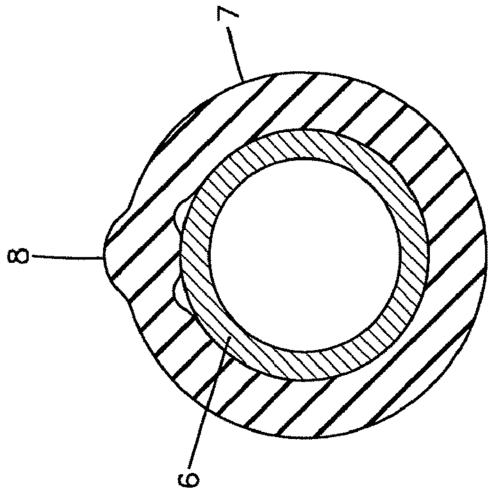
FIG. 8 is a transverse section view of a prior art grip assembled onto a golf club shaft.
Figure 7:
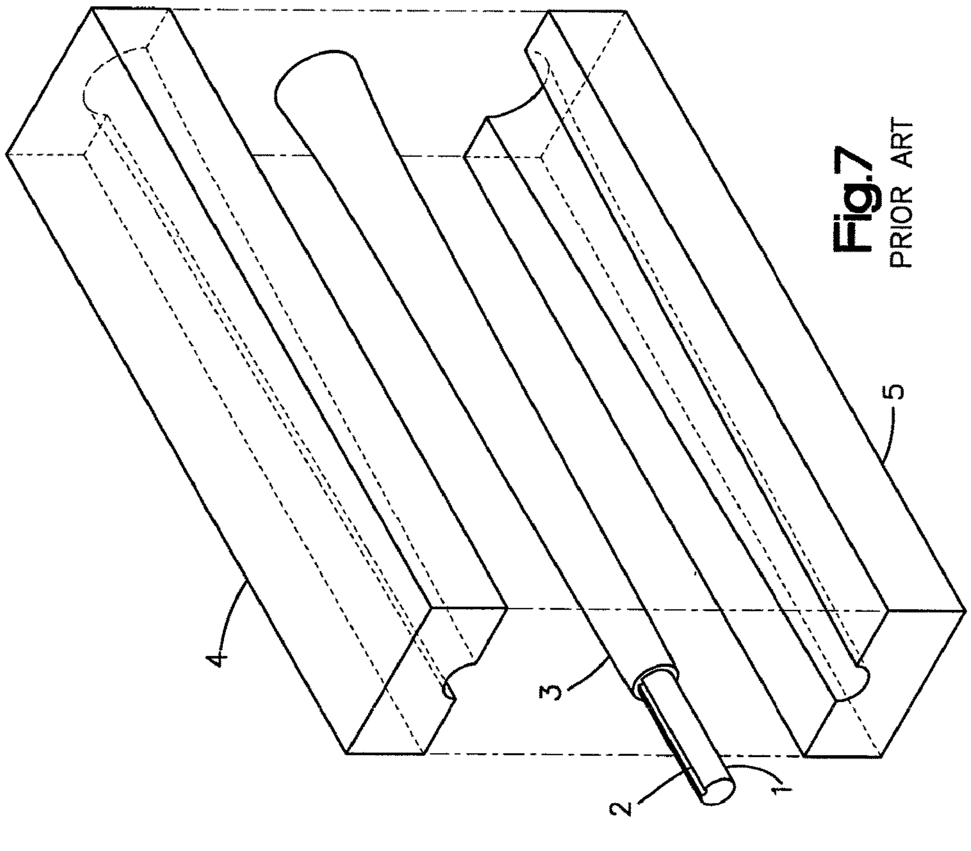
FIG. 7 is an exploded perspective view of the technique of molding a grip in the prior art.

Referring to FIG. 6, the process of manufacturing the grip by compression molding and installing on a golf club is indicated in block flow diagram, wherein at step 42 the mandrel or core with rib is fabricated and uncured elastomer is applied over the mandrel at step 44. The mandrel with the uncured elastomer is inserted into a suitable mold at step 46 and is compression molded to the configuration of a grip with the aperture in the closed end at step 48. The mold is then heated and the uncured elastomer vulcanized or cured to form a grip at step 50. Upon completion of the curing, the mandrel and grip are removed from the mold and the mandrel removed from the grip at step 52. The cured grip is then installed onto the end of golf club shaft at step 54; and, the rigid strip inserted through the aperture in the closed end of the grip into the groove, to form the raised rib on the grip at step 56.

Referring to FIGS. 9, 10, 11, and 12, an alternative version of the grip of the present disclosure is indicated generally at 80 shown installed on a club shaft 89 and has a rigid strip 82 received therein through the closed end 84 thereof which strip is received in a pocket 86 formed in the grip radially intermediate the inner periphery 88 and the outer surface thereof.

Figure 11:
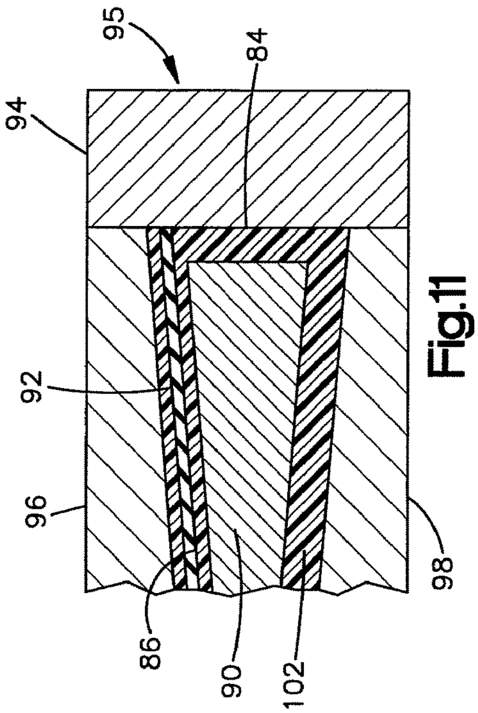
FIG. 11 is a portion of a section view taken along section indicating lines 11-11 of FIG. 9 and shows the arrangement of the material in the mold when closed in preparation for curing.
Figure 9:
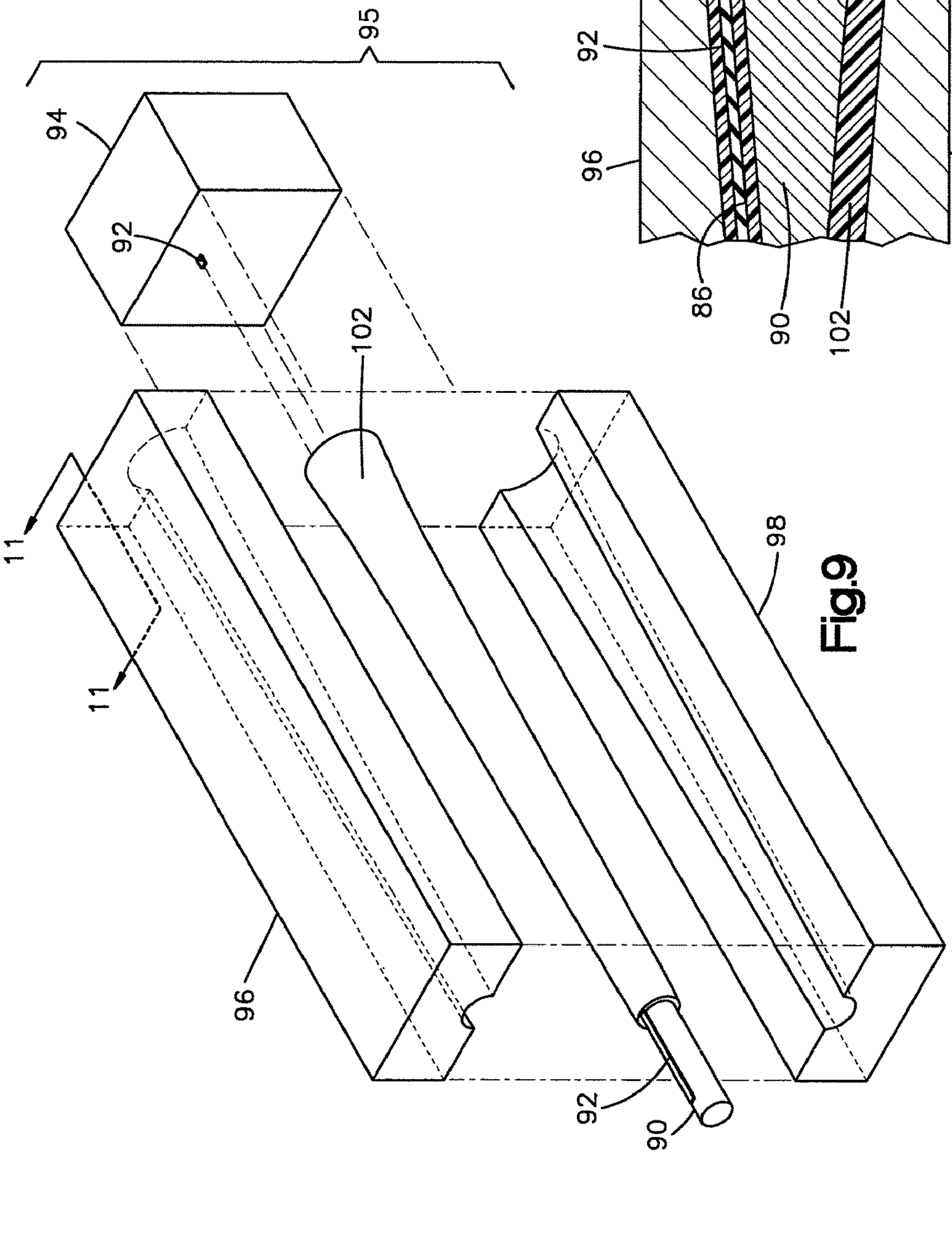
FIG. 9 is an exploded view of an alternative arrangement for molding of another version of the grip of the present disclosure.
Figure 10:
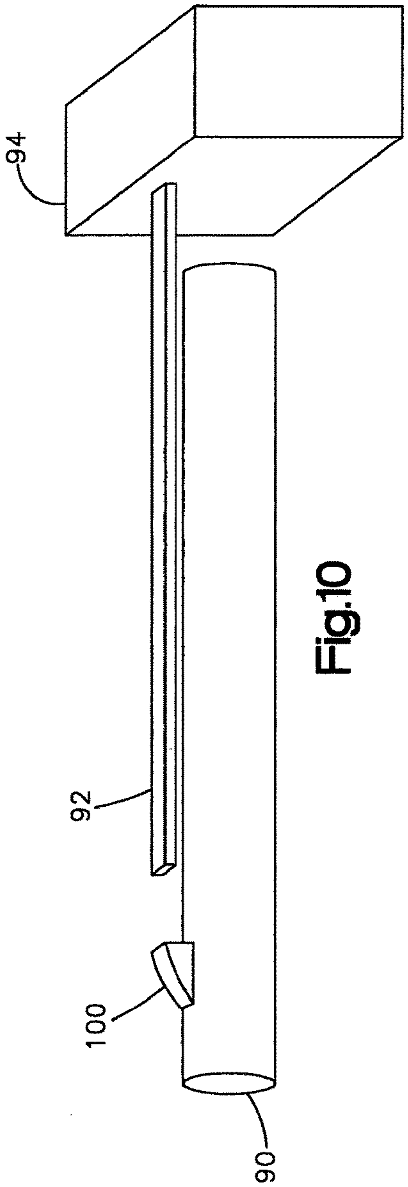
FIG. 10 is enlarged detail of the corebar arrangement of FIG. 9.

Referring to FIGS. 9, 10, and 11, a mandrel or corebar 90 has a secondary corebar 92 extending therealong in radially spaced arrangement; and, the secondary corebar 92 extends from the end section 94 of a mold comprising upper section 96 and lower section 98. The secondary corebar 92 has its free end engaging a support 100 provided on the mandrel 90 so as to maintain the secondary corebar 92 in spaced relationship with the mandrel 90 when the mold is closed. The mandrel 90 and the secondary corebar 92 are wrapped with uncured elastomer 102; and, the mold is closed thereover to compress the elastomer and cause it to flow between the secondary corebar 92 and the mandrel 90 so as to form the pocket 86 along a portion of the length of the grip. The configuration is illustrated in the cross-section in FIG. 11.

Figure 12:
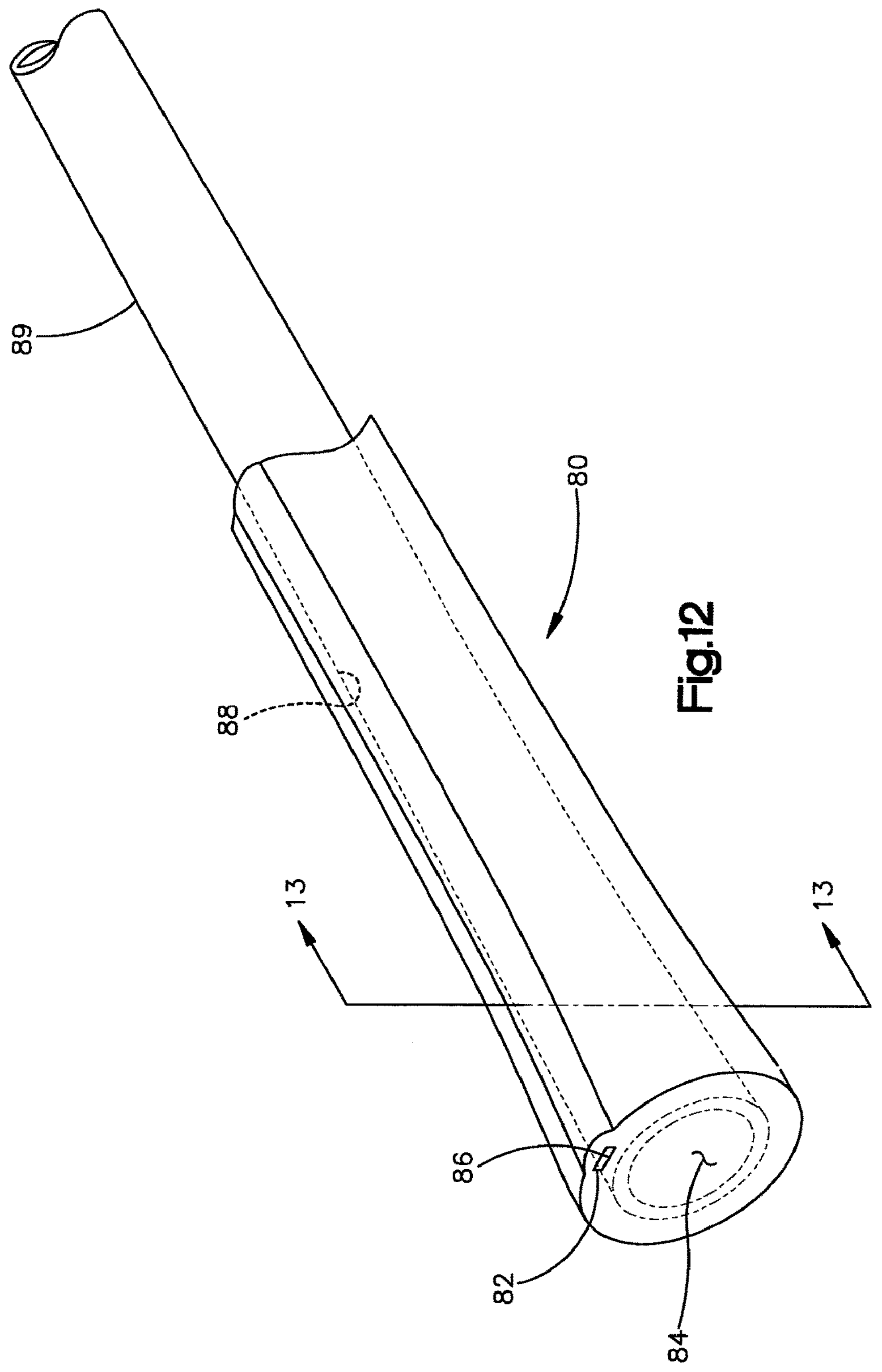
FIG. 12 is a portion of another version of a molded grip of the present disclosure.

The closed mold as shown in FIG. 11 is then heated to effect curing or vulcanization of the elastomer; and, the end section of the mold 94 and the secondary corebar 92 are then removed from the cured elastomer along with the mandrel 90 and the support 100 to form the completed grip of FIG. 12.

Figure 13:
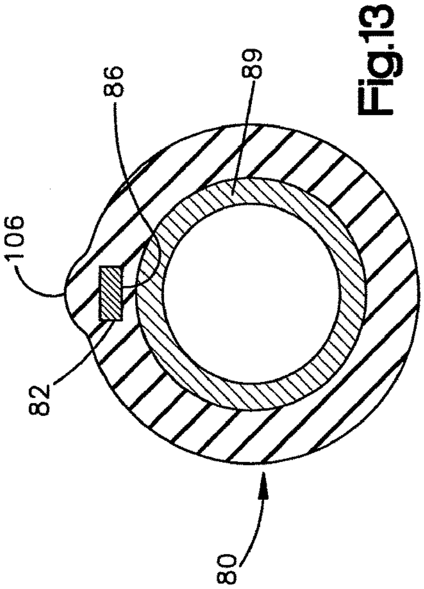
FIG. 13 is a section view taken along section indicating lines 13-13 of FIG. 12.

With reference to FIG. 13, the completed grip 80 is shown in cross-section as assembled over a club shaft 89; and, the raised portion of the outer periphery of the grip 80 is shown in FIG. 13 as forming a rib 106 therealong.

Figure 14:
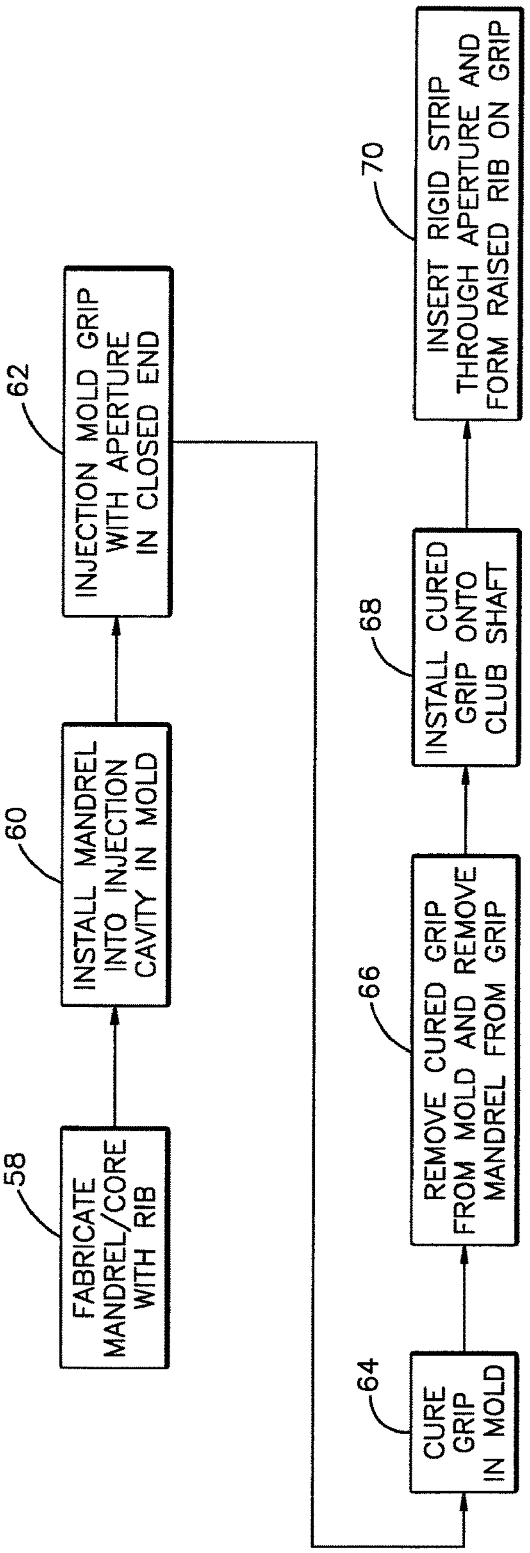
FIG. 14 is a block flow diagram of an alternate method of injection molding the grip of the present disclosure.

Referring to FIG. 14, alternately it is possible to mold the grip by injection molding where an unshown mold assembly is brought together at step 58 and sealed at step 60 in an injection mold cavity, before uncured elastomer is injected into the cavity at step 62 and held at temperature at step 64 to allow curing to take place to form the grip.

Upon completion of the curing, the mandrel and grip are removed from the mold and the mandrel removed from the grip at step 66. The cured grip is then installed onto the end of the golf club shaft at step 68; and, the rigid strip inserted through the aperture in the closed end of the grip and into the grip or pocket to form the raised rib on the grip at step 70.

The flexible elastomeric grip of the present disclosure thus has a raised portion or rib formed along the outer periphery thereof by insertion of a strip through an aperture in the closed end and into an internal groove in one version and in another version into a pocket formed in the grip to raise a portion of the periphery of the grip to form a rib of desired height and configuration therealong for enhancing gripability. The formation of the raised rib is by the insertion of a strip after the grip is assembled onto the golf club shaft and thus permits the grip outer periphery to be buffed after removal from the mold without causing any deformation of the desired rib since the rib is not yet formed at that stage of the manufacture. The dimensions and configuration of the rib are thus determined by the insertion of the rigid strip.

The exemplary embodiment has been described and illustrated with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A flexible grip for use on a golf club comprising:

(a) an elongated tubular member formed of elastomeric material having a substantially closed end and an open end adapted for being received over the shaft of the golf club wherein the substantially closed end has an aperture therein on an outer surface of the grip when the substantially close end is closed, and wherein the aperture and closed end are at a longitudinal end of the grip;

(b) a void formed in the tubular member, wherein the void extends at least a portion of the length of the member, wherein the aperture communicates with the void; and, (c) a strip of rigid material, wherein upon assembly of the grip onto the club shaft, the strip is inserted through the aperture into the void whereby the region of the outer periphery of the grip over the void is raised to form a rib along the outer periphery of the grip.

2. The grip of claim 1, wherein the strip has a width in the range of 2 to 9 millimeters.

3. The grip of claim 1, wherein the strip has a thickness in the range of 0.127 to 1.016 millimeters.

4. The grip of claim 1, wherein the strip is formed of one of (i) metal, (ii) plastic, and (iii) composite material.

5. The grip of claim 1, wherein the strip has the thickness thereof varied along the length thereof.

6. The grip of claim 1, wherein the tubular member is formed of elastomeric material having a durometer hardness in the range of 25-75 on the Shore "A" scale.

7. The flexible grip of claim 1, wherein the void comprises a pocket formed intermediate the inner and outer periphery of the tubular member.

8. The grip of claim 7, wherein the strip has a width in the range of 2 to 9 millimeters.

9. The grip of claim 7, wherein the strip has a thickness in the range of 0.127 to 1.016 millimeters.

10. The flexible grip of claim 1, wherein the void comprises a groove formed on the inner periphery of the tubular member.

* * * * *